US012722259B2

(12) United States Patent
Gupte

(10) Patent No.: US 12,722,259 B2
(45) Date of Patent: Sep. 1, 2026

(54) MULTIPLE SPRING WIRE-FORM RETENTION SOCKET

(71) Applicant: Snap-on Incorporated, Kenosha, WI (US)

(72) Inventor: Anup A. Gupte, Buffalo Grove, IL (US)

(73) Assignee: Snap-on Incorporated, Kenosha, WI (US)

( * ) Notice: Subject to any disclaimer, the term of this patent is extended or adjusted under 35 U.S.C. 154(b) by 338 days.

(21) Appl. No.: 18/372,267

(22) Filed: Sep. 25, 2023

(65) Prior Publication Data

US 2025/0100113 A1 Mar. 27, 2025

(51) Int. Cl.
*B25B 23/10* (2006.01)
*B25B 13/06* (2006.01)

(52) U.S. Cl.
CPC ............ *B25B 23/108* (2013.01); *B25B 13/06* (2013.01)

(58) Field of Classification Search
CPC ....... B25B 13/06; B25B 13/065; B25B 13/48; B25B 13/56; B25B 23/0035; B25B 23/0071; B25B 23/02; B25B 23/108; B25B 23/10
See application file for complete search history.

(56) References Cited

U.S. PATENT DOCUMENTS 271,549 A * 1/1883 True .................... B25B 23/0057 81/125
2,304,271 A * 12/1942 Merriman ............. B25B 13/483 81/125
2,798,394 A 7/1957 Hubbard
2,805,594 A 9/1957 Fogel
3,630,107 A 12/1971 Carr
3,665,791 A 5/1972 Carr
4,644,831 A 2/1987 Yang
4,787,278 A 11/1988 Bononi
5,042,333 A 8/1991 Huang
(Continued)

FOREIGN PATENT DOCUMENTS

TW M3884749 U 7/2010
TW 201611961 A 4/2016
TW 202306709 A 2/2023

OTHER PUBLICATIONS

Australian Patent Office, Examination Report No. 1 issued in corresponding Application No. 2024205114, dated Apr. 7, 2025, 3 pp.

(Continued)

*Primary Examiner* — Robert J Scruggs
(74) *Attorney, Agent, or Firm* — Taft, Stettinius & Hollister LLP

(57) ABSTRACT

A socket having a working end with a socket receiving area that is adapted to receive a work piece, and an opposing drive end adapted to engage a lug of a torque application tool. The socket includes spring-wire forms disposed in the socket receiving area that are adapted to apply a biased force to the work piece when the work piece is received in the socket receiving area, wherein the spring-wire forms include a first and second end and arms formed proximal to the first and second ends, and the arms include a bent portion that is adapted to engage axial slots when a work piece is received in the socket receiving area.

20 Claims, 12 Drawing Sheets

(56) References Cited

U.S. PATENT DOCUMENTS

| | | | | |
|---|---|---|---|---|
| 5,277,531 | A | 1/1994 | Krivec | |
| 5,323,673 | A | 6/1994 | Martinez et al. | |
| 5,724,872 | A * | 3/1998 | Shih .................... | B25B 23/0035 81/125 |
| 5,943,923 | A | 8/1999 | Shih | |
| 5,960,682 | A | 10/1999 | Yamashita | |
| 6,082,229 | A | 7/2000 | Shih | |
| 6,178,854 | B1 | 1/2001 | Shih | |
| 6,626,067 | B1 | 9/2003 | Iwinski et al. | |
| 7,188,552 | B1 | 3/2007 | Koppenhoefer | |
| 7,311,022 | B2 | 12/2007 | Putney et al. | |
| 7,523,688 | B2 | 4/2009 | Putney et al. | |
| 7,765,898 | B2 | 8/2010 | Sakaguchi et al. | |
| 8,939,050 | B2 | 1/2015 | Chen | |
| 9,452,516 | B2 | 9/2016 | Alavi | |
| 9,718,170 | B2 | 8/2017 | Eggert et al. | |
| 9,789,593 | B2 | 10/2017 | Kao | |
| 10,780,557 | B2 | 9/2020 | Wolzak | |
| 11,045,930 | B2 | 6/2021 | Dietze et al. | |
| 2004/0163500 | A1 | 8/2004 | Walsh | |
| 2006/0236822 | A1 | 10/2006 | Nish | |
| 2007/0044596 | A1 | 3/2007 | Chang-Ying | |
| 2010/0294087 | A1 | 11/2010 | Hu | |
| 2023/0031054 | A1 | 2/2023 | Gupte | |

OTHER PUBLICATIONS

UK Intellectual Property Office, Combined Search and Examination Report issued in corresponding Application No. GB2411164.3, dated Jan. 15, 2025, 8 pp.

Taiwan Patent Office, First Office Action issued in corresponding Application No. 113135769, dated Apr. 10, 2025, 15 pp.

S9706KRA—3/8" Drive 6-Point SAE 5/8" Flank Drive® Standard Retention Spark Plug Socket, Snap-on, available at https://shop.snapon.com/product/Retention/3-8%22-Drive-6-Point-SAE-5%2F8%22-Flank-Drive-Standard-Retention-Spark-Plug-Socket/S9706KRA (accessed on Sep. 22, 2023).

Wera Sockets with Holding Function, available at https://www.kctool.com/1-4-6-point-sockets/?_ bc?fsnf=1&Features=Screw+Holding (accessed on Dec. 21, 2023).

Koken Nut Grip sockets, Koken USA, available at https://kokenusa.com/products/nut-grip-socket-1-2sq-dr-14mm (accessed on Oct. 5, 2023).

* cited by examiner

MULTIPLE SPRING WIRE-FORM RETENTION SOCKET

TECHNICAL FIELD OF THE INVENTION

The present invention relates generally to sockets for hand tools. More particularly, the present invention relates to sockets adapted to retain a fastener in the socket.

BACKGROUND OF THE INVENTION

Sockets are a common form of engaging and then applying torque to work pieces, such as bolts, nuts, screws, or other fasteners. Sockets are typically elongated, cylindrical pieces that engage the work piece head at a working end and connect to a torque application tool having a lug, for example a socket wrench, torque wrench, or impact driver, at a drive end opposite the working end. The socket can apply torque to a work piece to either insert or remove the work piece from a working material by transferring torque applied by the wrench connected to the work piece.

Sockets can be different sizes or shapes to account for differently sized or shaped work pieces. For example, a bolt having a hexagonal head that is $\frac{1}{2}$" wide can be torqued with a $\frac{1}{2}$" socket. Such a socket would typically include a $\frac{1}{4}$", $\frac{3}{8}$", or $\frac{1}{2}$" square female aperture disposed on the working end that would be matingly coupled with a torque application tool having a similarly $\frac{1}{4}$", $\frac{3}{8}$" or $\frac{1}{2}$" square male drive lug. The socket/torque application tool engagement also typically includes a detent mechanism, where an outwardly biased ball disposed on the drive lug of the torque application tool detentably engages an indent disposed on the square female of the socket to releasably detain the socket on the drive lug. Typically, the ball is outwardly biased with a compression spring. When the torque application operation is complete, or the socket needs to be changed or otherwise removed from the torque application tool, the socket can thus be forcibly removed from the lug by applying an outward force that causes the ball to overcome the outward bias of the ball in the detent mechanism.

However, conventional sockets have some amount of lost-motion when used to turn work pieces, which is referred to as backlash or slippage. In other words, when the socket turns but the work piece does not immediately turn in kind. Backlash occurs due to the minimal clearance needed to easily insert the work piece into the socket. Current sockets are also unable to retain the work piece in the socket due to the clearance provided to insert the work piece. Therefore, when a work piece is inserted into the socket, it often easily falls out.

Some sockets may include retention features for retaining the fastener in the socket. Retention sockets may be used when the fastener is in a hard-to-reach or otherwise challenging location. Current retention sockets may utilize magnets, spring/balls, and flat sheet metal springs. There are drawbacks to the current solutions. For example, magnetic sockets collect metallic debris and are more expensive to manufacture. Ball-spring type sockets weaken the socket due to the addition of holes in the hex pocket, and the balls may jam after repeated usage.

SUMMARY OF THE INVENTION

The present invention relates broadly to a socket that retains a work piece in a socket. The socket includes a biasing member disposed in a socket engaging area on a working end of the socket and is adapted to apply a biased frictional force to a work piece disposed in the socket. Multiple biasing members may be disposed in the socket engaging area, and the biasing members are preferably spring-wire forms. The biasing members may be disposed in grooves or slots in the socket. By providing multiple biasing members, the stresses on each spring are significantly reduced, compared to a single-spring retention socket. A socket having a socket engaging area may be adapted to receive a number of different spring-wire forms without requiring a change to the socket engaging area, thus reducing manufacturing costs and complexity, compared to existing retention sockets. The spring-wire forms may be tailored to a desired outcome. For example, the spring-wire forms may be adapted to engage fasteners having a shorter head height and/or a taller head height.

In an embodiment, the present invention includes a socket having a working end with a socket engaging area that is adapted to receive a work piece, such as a fastener head, and an opposing drive end adapted to engage a lug of a torque application tool. The socket includes first and second spring-wire forms adapted to apply a biased frictional force to the work piece and includes opposing first and second ends and first and second axial arms disposed proximal to the respective first and second ends, wherein at least one of the first and second arms includes a bent portion defining an angle, axial slots formed in the inner surface of the socket receiving area that are adapted to frictionally engage the bent portion of the first and second axial arms, and a circumferential groove disposed on an inner surface of the socket receiving area.

In another embodiment, the present invention includes a socket including first and second pairs of spring-wire forms adapted to apply a biased frictional force to the work piece, such as a head of a fastener, wherein each spring-wire form includes opposing first and second ends and first and second axial arms disposed proximal to the respective first and second ends, wherein at least one of the first and second arms includes a bent portion, axial slots disposed in the inner surface of the socket receiving area, wherein the bent portion engages the axial slot, and a circumferential groove disposed on an internal surface of the socket receiving area. The angle of the bent portion of the first pair of spring-wire forms may be different than the angle of the bent portion of the second pair of spring spring-wire forms.

In another embodiment, the present invention includes a socket having a working end with a socket receiving area that is adapted to receive a work piece and an opposing drive end adapted to engage a lug of a torque application tool. The socket includes a first spring-wire form adapted to apply a biased frictional force to the work piece and includes opposing first and second ends and first and second axial arms disposed proximal to the respective first and second ends, wherein at least one of the first and second arms includes a bent portion, axial slots disposed in the inner surface of the socket receiving area, wherein the bent portion engages the axial slot, and a circumferential groove disposed in an internal surface of the socket receiving area.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
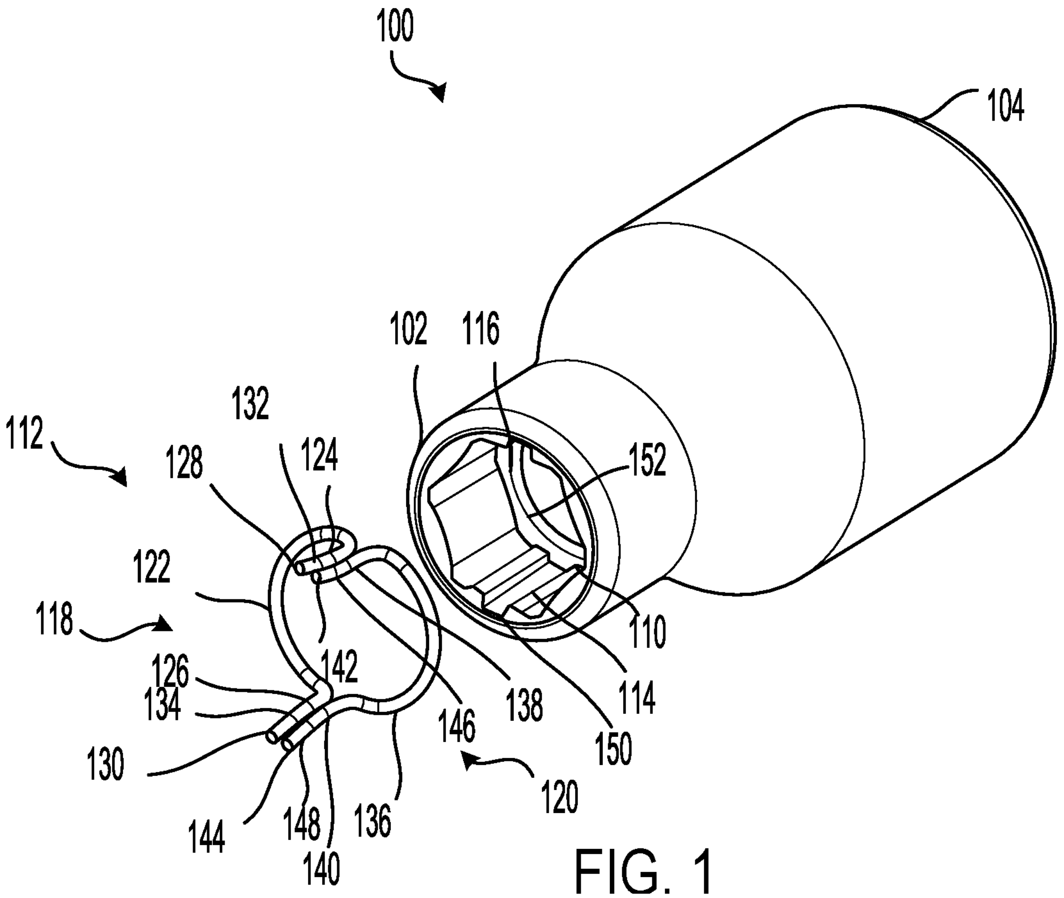
FIG. 1 is a perspective, disassembled view of a socket, according to an embodiment of the present invention.
Figure 2:
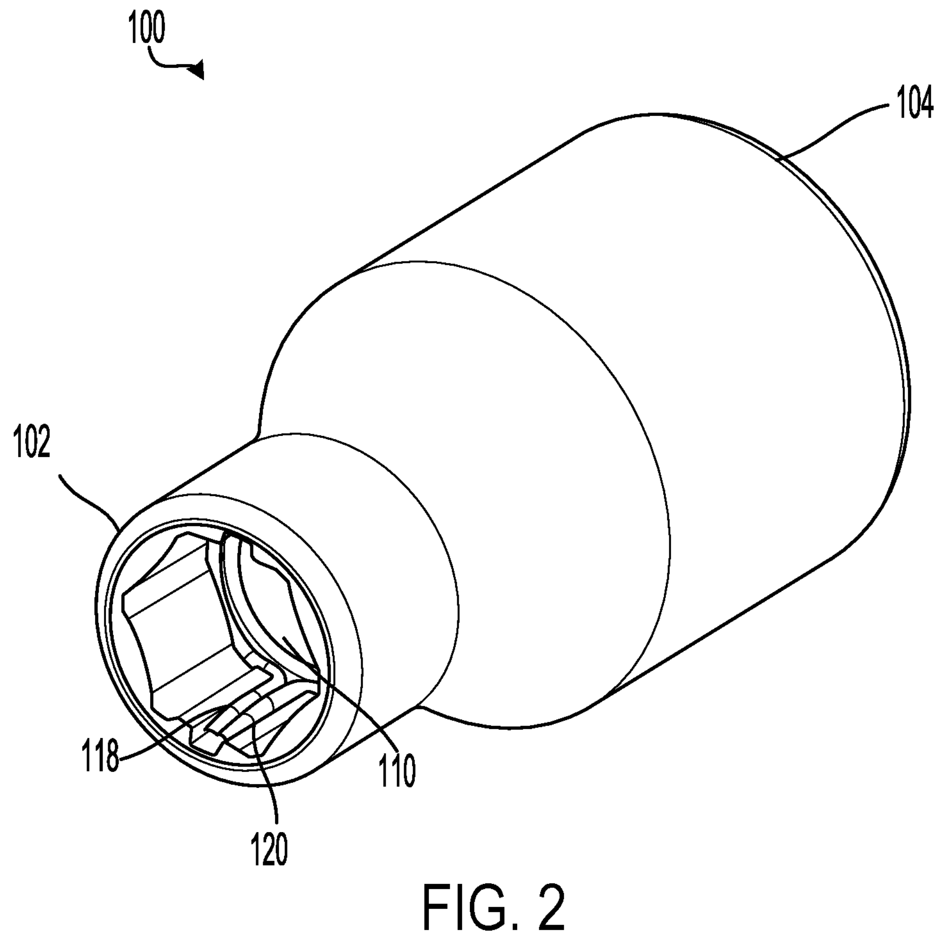
FIG. 2 is a perspective, assembled view of the socket of FIG. 1.
Figure 3:
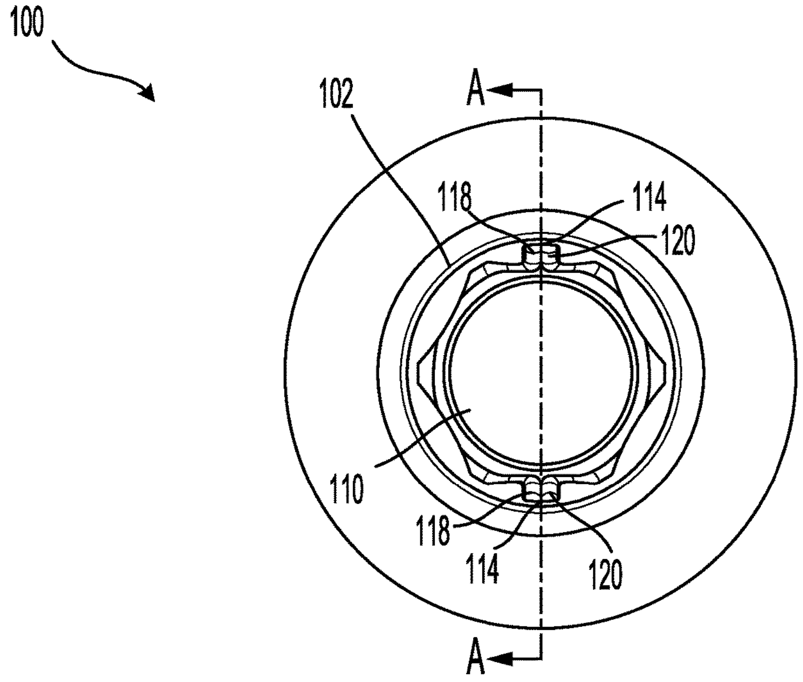
FIG. 3 is a plan, front assembled view of the socket of FIG. 1.
Figure 4:
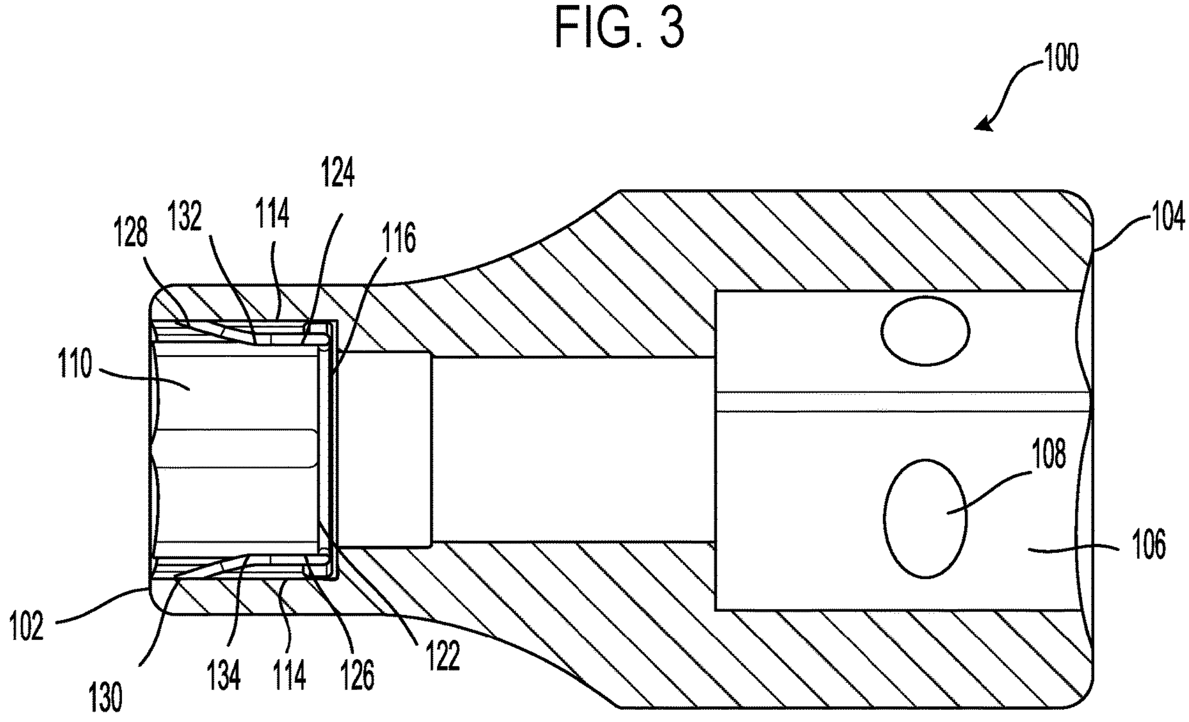
FIG. 4 is a section view of the socket taken along line A-A of FIG. 3.
Figure 5:
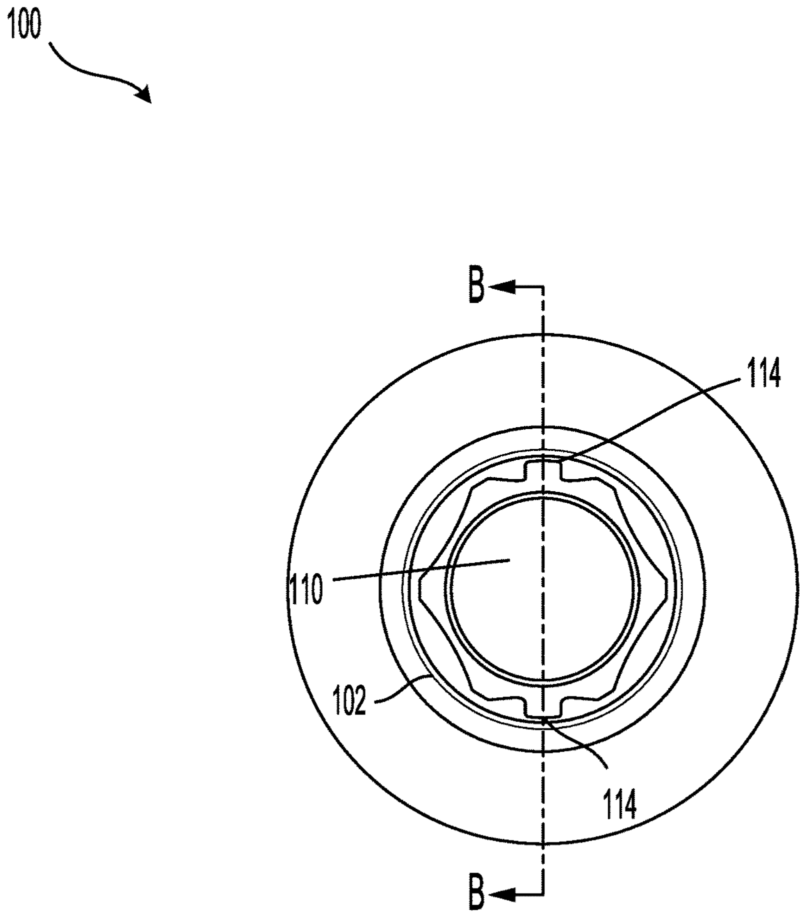
FIG. 5 is a plan, front view of the socket of FIG. 1, with a biasing member removed, according to an embodiment of the present invention.
Figure 6:
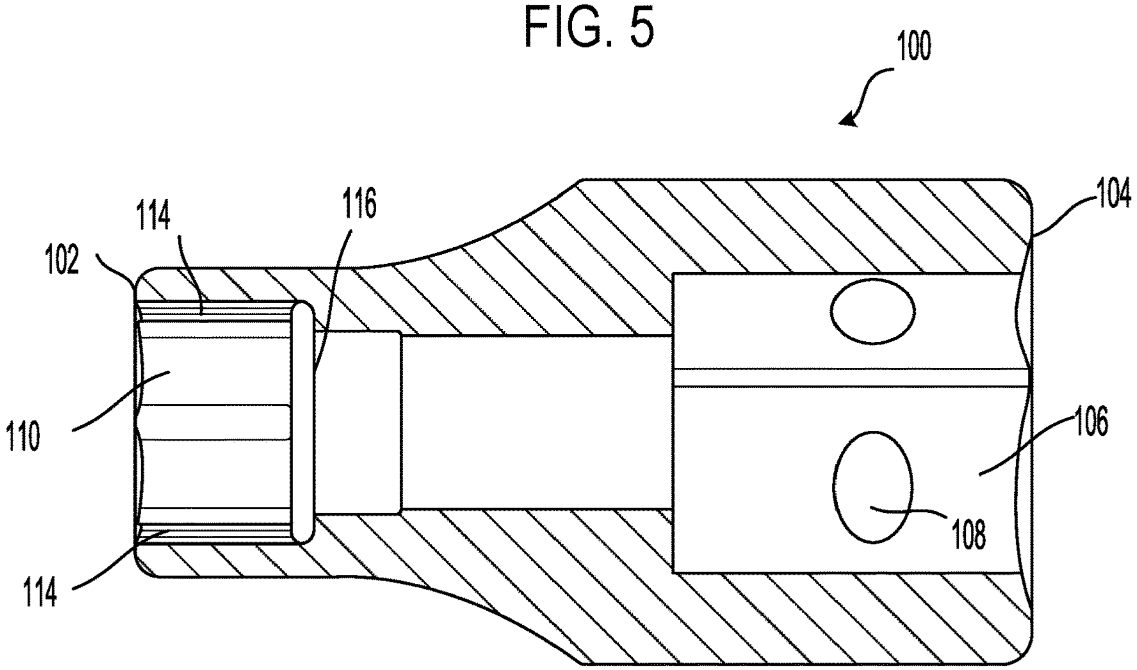
FIG. 6 is a section view of the socket taken along line B-B of FIG. 5.
Figure 7:
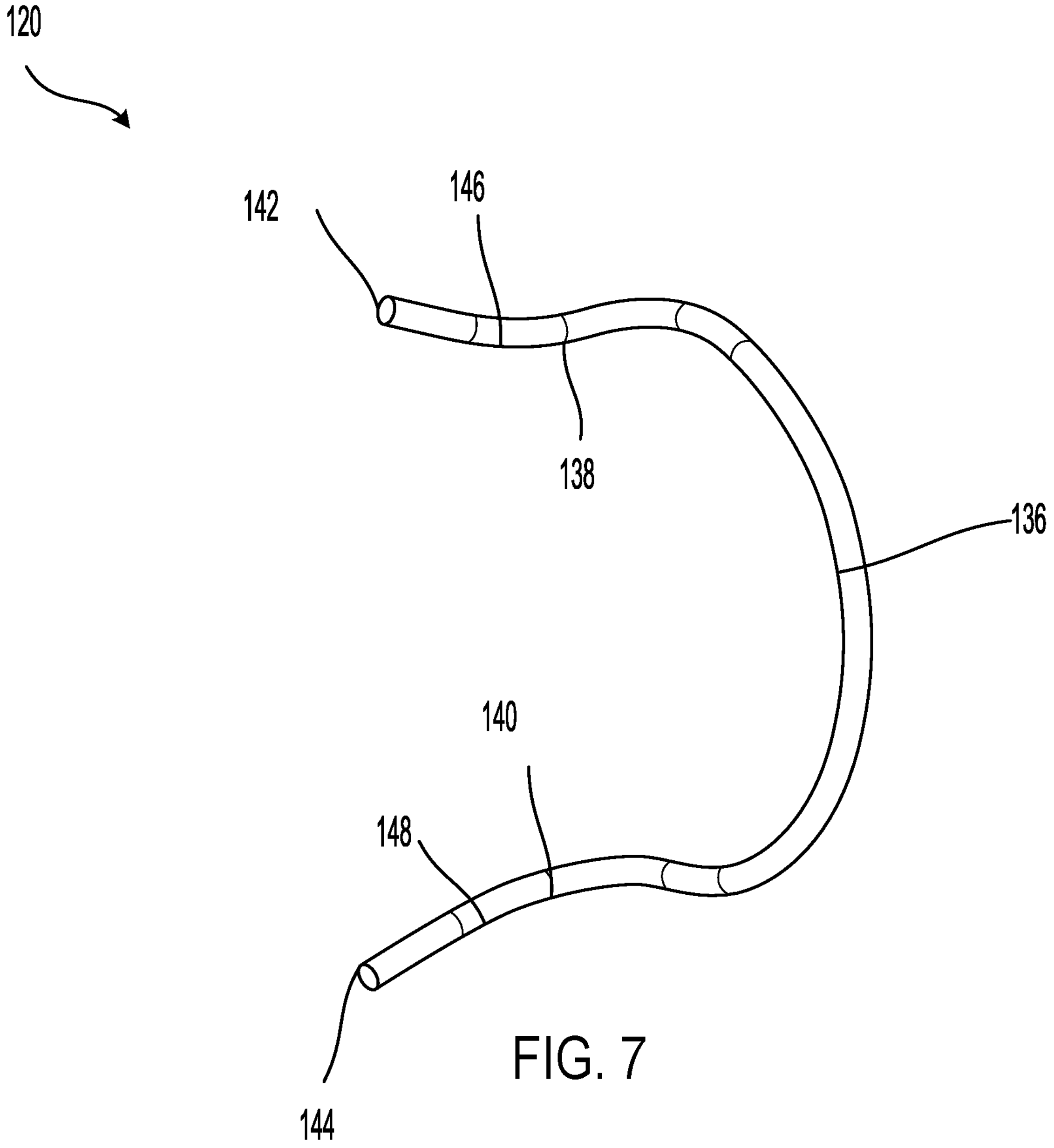
FIG. 7 is a perspective view of an exemplar bias member, according to an embodiment of the present invention.
Figure 8:
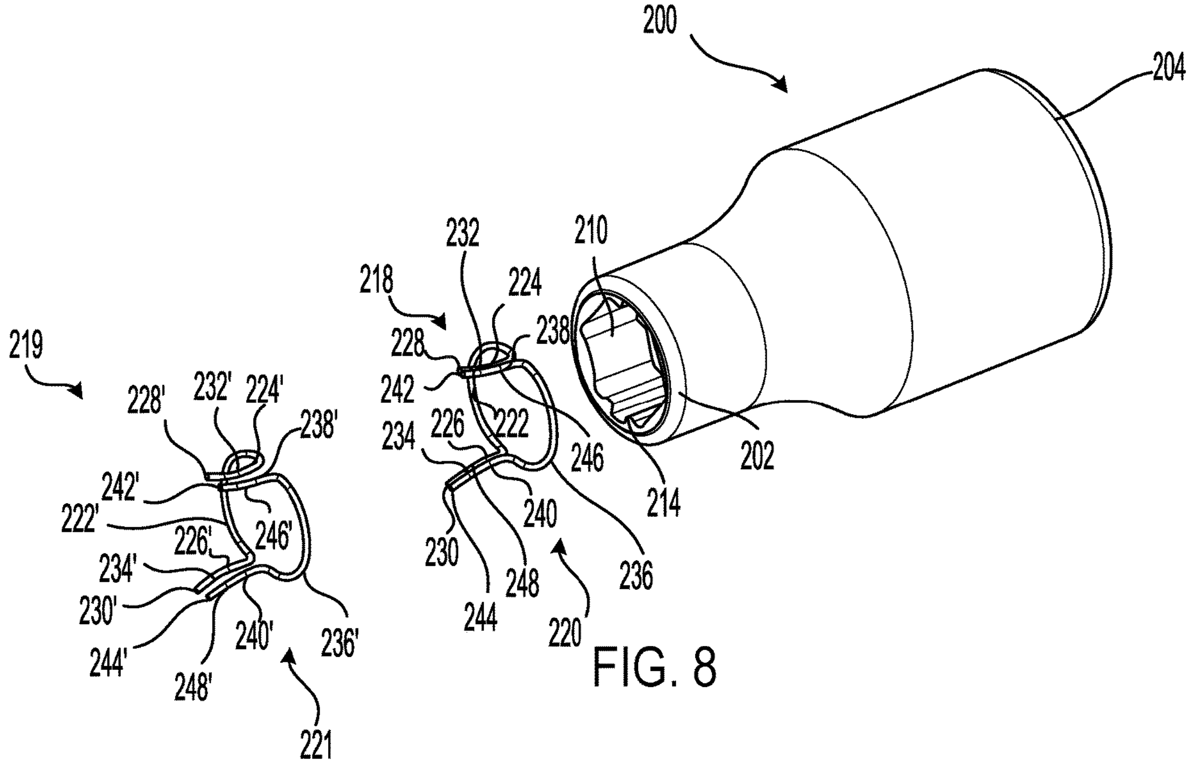
FIG. 8 is a perspective disassembled view of a socket, according an embodiment of the present invention.
Figure 9:
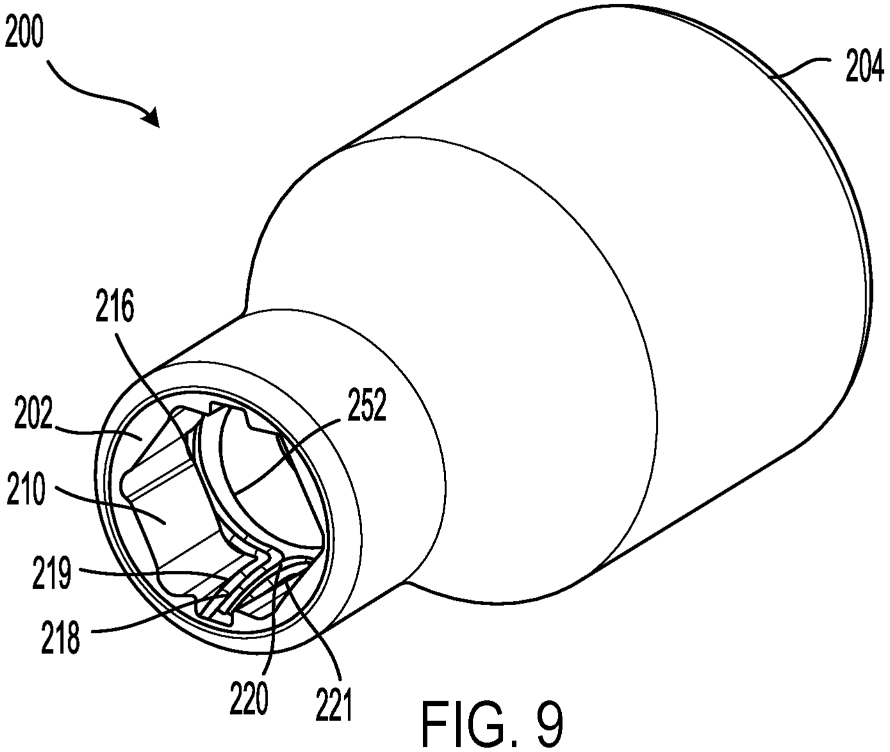
FIG. 9 is a perspective assembled view of the socket of FIG. 8.
Figure 10:
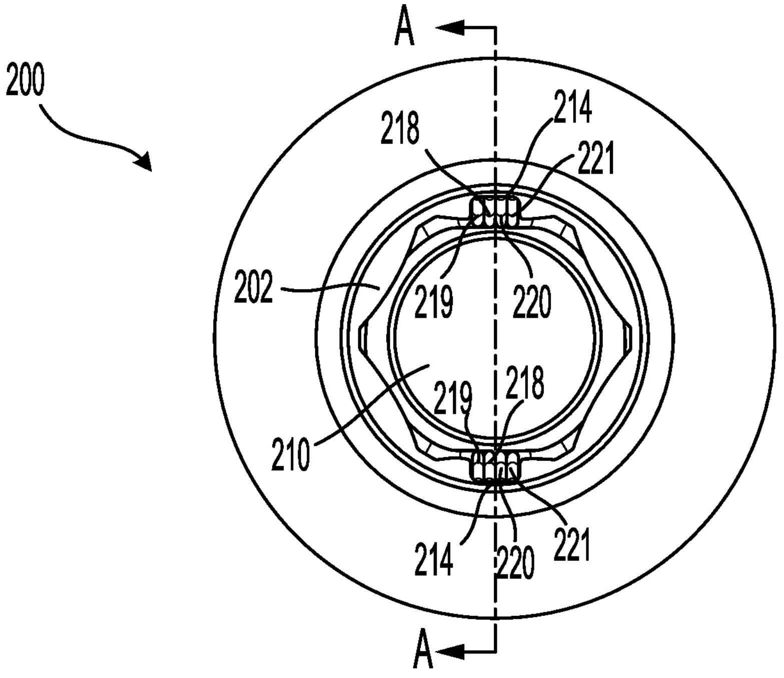
FIG. 10 is a plan, front assembled view of the socket of FIG. 8.
Figure 11:
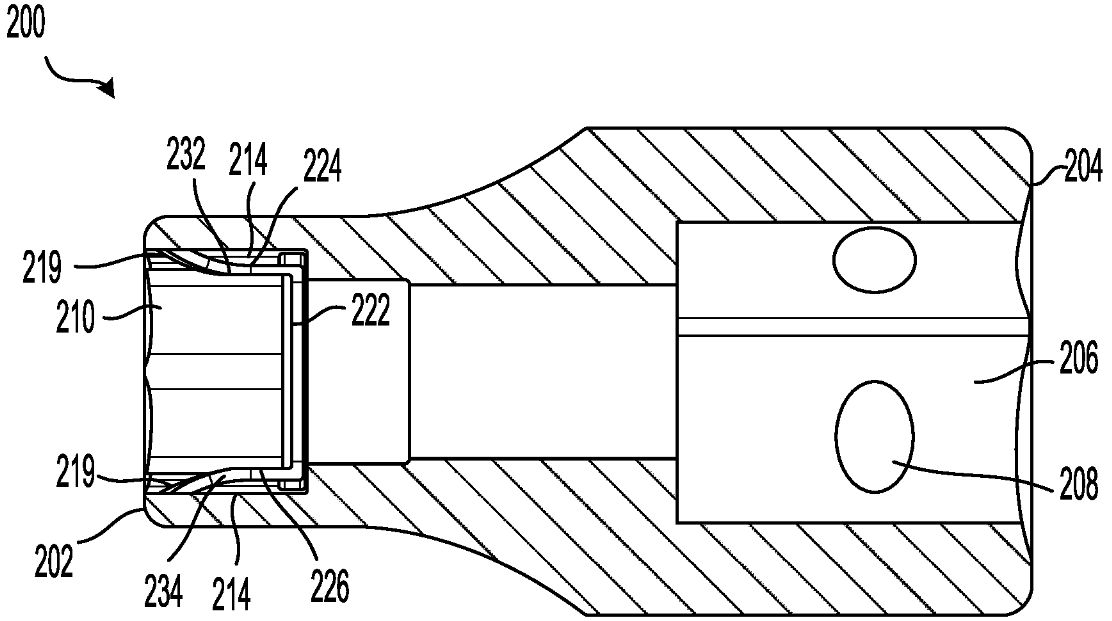
FIG. 11 is a section view of the socket taken along line A-A of FIG. 10.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the present invention and is not intended to limit the broad aspect of the invention to any one or more embodiments illustrated herein. As used herein, the term "present invention" is not intended to limit the scope of the claimed invention, but is instead used to discuss exemplary embodiments of the invention for explanatory purposes only.

The present invention relates broadly to a socket adapted to limit or control backlash or slippage between the socket and a work piece engaged with the socket. The socket also can removably retain a work piece disposed in the socket receiving area. The socket includes a biasing member, such as spring-wire forms, disposed in a socket receiving area on the working end of the socket, and is adapted to apply a biased, frictional force to a work piece engaged by the socket. The socket receiving area may include two diametrically opposing axial slots. The axial slots may have a cross-section having a rectangular, half-oval, half-circular, or other shape adapted to receive a bias member. The slots may be formed by suitable manufacturing techniques, such as forming, machining, grinding, or broaching. The socket receiving area also includes a circumferential groove distal to the working end of the socket. A portion of the bias member may be substantially seated in the circumferential groove to restrict axial movement of the bias member relative to the socket.

In an embodiment, the bias member may include two spring-wire forms. The spring-wire forms each have a curved portion with a first and second arm on each end of the spring-wire form, where each of the arms include an angled portion between the curved portion and the first and second ends. The arms of the spring-wire forms may be substantially disposed in axial slots in the socket receiving area, and the curved portion may be substantially disposed in a circumferential groove in the socket receiving area. The arms of the first spring-wire form may abut or be adjacent to the arms of the second spring-wire form when disposed in the axial slots.

When a work piece, such as a fastener head or bolt, is disposed in the socket, the bent portions of the arms elastically bend radially toward the slot to accommodate the work piece. A radially inward bias force generated by the bias members maintains a positive, frictional engagement between the socket and the work piece, thereby limiting or controlling lost-motion (i.e., backlash or slippage), allowing the socket to better engage the work piece. When the work piece is retracted from the socket, the bent portions of the spring-wire form arms return to their original shape. The two spring-wires provide an increased gripping force, compared to a single-spring retention socket design. Further, spring-wire forms may be formed to provide a desired retention force. The spring-wired forms may be formed to provide different entry angles for work pieces to target a specific outcome, which may be beneficial for effectively gripping work pieces having a shorter or taller head height.

In another embodiment, the bias member may include four spring-wire forms. The spring-wire forms may be substantially disposed in the slots and grooves of a socket receiving area. The four spring-wire forms may be understood as two pairs of spring-wire forms, and the first pair may include arms having angled bends at a first angle, and the second pair may include arms having angled bends at a second angle. The socket receiving area of the socket of this four-spring-wire embodiment may be the same as the socket receiving area of a socket of the two-spring-wire embodiment.

The number of spring-wire forms included in the socket can be varied, without having to form a socket having slots and grooves of various sizes. The specific shape, size, and strength of the spring-wires can be varied based on desired properties, without changing the structure of the socket receiving area of the socket. Thus, the sockets of the present invention can provide different angles in the bend portions of the arms, different wire sizes, different retention forces in a simple and cost effective manner.

Referring to FIGS. 1-7, a socket 100 includes a working end 102 and an opposing drive end 104. The drive end 104 is adapted to releasably couple with a lug of a torque application tool, such as, for example, a drill, ratchet, torque, or impact wrenches, screwdriver, router, etc., in a well-known manner.

The working end 102 includes a socket receiving area 110 that is adapted to receive a work piece, such as, for example, a bolt, nut, screw, or other threaded fastener, for transferring torque from the torque application tool to the work piece. The socket receiving area 110 may have a conventional polygonal cross-sectional shape axially extending at least partially into the body from the working end 102 towards the drive end 104. In an embodiment, the polygonal cross-sectional shape is a generally hexagonal shape adapted to engage a hexagonal fastener head, such as a hexagonal bolt head or nut. In yet another embodiment, the working end 102 may include a different cross-sectional shape adapted to mate with a different shaped fastener head, for example, triangular, rectangular, pentagonal, heptagonal, octagonal, hex shaped, double hexagonal, spline or other shapes of the type.

The socket receiving area 110 includes axial slots 114 disposed therein and a circumferential groove 116. In an embodiment, the circumferential groove 116 is disposed on an inner surface 152 of the socket receiving area 110 and at least partially surrounds the work piece aperture 110. The axial slots 114 may be disposed on diametrically opposing faces of the socket receiving area 110. In another embodiment, the axial slots 114 may be disposed less than 180 degrees from each other. While two axial slots are shown in the figures, it will be appreciated that three, four or more axial slots in the socket receiving area 110 may be provided.

A biasing member 112 is disposed in the socket receiving area 110 and is adapted to apply a biased frictional force to a work piece head to limit or control lost-motion (i.e., backlash or slippage) during application of torque thereto, and to better engage the work piece in the socket receiving area 110. In an embodiment, the biasing member 112 provides frictional engagement with a work piece, wherein the work piece can be retained in the socket, thus allowing easier use of the socket and alignment of the work piece with an aperture, including the threads of such aperture, that it is to be inserted.

The biasing member 112 includes first 118 and second 120 spring-wire forms. The first spring wire form 118 includes a curved portion 122 and first 124 and second 126 arms having respective ends 128, 130. The first 124 and second 126 arms of the first spring wire form 118 each includes bent portion 132, 134. The second spring-wire form 120 includes a curved portion 136 and first 138 and second 140 arms having respective ends 142, 144. The first 138 and second 140 arms each includes bent portion 146, 148. The first and second arms 124, 126 of the first spring-wire form 118 may be substantially disposed in the axial slots 114, and the curved portion 122 may be substantially disposed in the circumferential groove 116. The first and second arms 138, 140 of the second spring-wire form 120 may be similarly disposed in axial slots 114, and the first arm 124 of the first spring-wire form 118 may be in the same axial slot 114 as the first arm 138 of the second spring-wire form 120. The first and second spring-wire forms 118, 120 may face toward each other, with the curved portions 122, 136 of each spring-wire form face away from each other.

During operation, the bent portions 132, 134, 146, 148 apply a radially inward bias force on a work piece, and elastically move radially into the axial slots 116 as the work piece is inserted into the socket receiving area 110. Conversely, bent portions 132, 134, 146, 148 retract due to the bias force (i.e., elastically moves radially away from axial slots 114) when the work piece is retracted from the work piece aperture 110. The bias force of the spring-form wires 118, 120 may help retain the spring-wire forms 118, 120 in the socket receiving area 110. The ends of spring-wire forms 128, 130 may also be in contact with an end of the slot 150 proximate to the working end 102 to retain the spring-wire forms in the socket receiving area 110. The curved portions 122, 136 are also retained in the circumferential groove 116 to retain the spring-wire forms 118, 120 in the socket receiving area 110.

The bent portions 132, 134 define an angle that is offset from the axis of the socket receiving area 110. The bent portions 132, 134 may be proximal or distal relative to the working end 102, depending on the work piece or the desired gripping force. The angle of the bent portions may also be varied to provide a desired entry angle for a work piece as it enters the socket receiving area 110. In an embodiment, the first 124 and second 126 arms have the same location and bend angle. In another embodiment, the first arm 124 is different than the second arm 126, and the arms provide angle of entry and/or a different gripping force on the work piece when it is disposed in the socket receiving area 110.

The curved portion 122 of the first spring-wire form 118 may have a circular shape that corresponds to circumferential groove 116. In an embodiment, the curved portion 122 is about 180 degrees, providing first 124 and second 126 arms about 180 degrees from each other in the socket receiving area 110. It will be appreciated that the curved portion 122 may extend less or more than 180 degrees.

The curved portion 136 of the second spring-form wire 120 may similarly be retained in circumferential groove 116, with the arms of the second spring-wire form 120 also disposed in axial slots 114, adjacent to the arms of the first spring-wire form 118. The second spring-wire form 120 may be identical to the first spring-form wire 118. In an embodiment, the bent portions 146, 148 may have different entry angles and provide a different gripping force than the first spring-form wire 118. In another embodiment, the bent portion 132 of the first arm 124 of the first spring-wire form 118 may have the same first angle as the bent portion 146 of the first arm 138 of the second-spring wire form 120, and the bent portion 134 of the second arm 126 of the first spring-wire form 118 and the bent portion 148 of the second arm 140 of the second spring-wire form 120 may have the same second angle. In an embodiment, bent portions 132, 134, 146, 148 may include the same angle.

Referring to FIGS. 8-17, another embodiment of the socket 200 of the present invention is shown. The socket 200 is substantially the same as socket 100. Similar to the socket 100, socket 200 includes working 202 and driving 204 ends, a drive aperture 206, a socket receiving area 210, a bias member 212, axial slots 214, and a circumferential groove 216.

The drive end 204 is adapted to releasably couple with a lug of a torque application tool, such as, for example, a drill, ratchet, torque, or impact wrenches, screwdriver, router, etc., in a well known manner.

The working end 202 includes a socket receiving area 210 adapted to receive a head of a work piece, such as, for example, a bolt, nut, screw, or other threaded fastener, for transferring torque from the torque application tool to the work piece. The socket receiving area 210 may have a polygonal cross-sectional shape axially extending at least partially into the body from the working end 202 toward the drive end 204. In an embodiment, the polygonal cross-sectional shape is a generally hexagonal shape adapted to engage a hexagonal fastener head, such as a hexagonal bolt head or nut. In yet another embodiment, the working end 202 may include a different cross-sectional shape adapted to mate with a different shaped fastener head, for example, triangular, rectangular, pentagonal, heptagonal, octagonal, hex shaped, double hexagonal, spline or other shapes of the type.

The socket receiving area 210 includes axial slots 214 disposed therein and a circumferential groove 216. In an embodiment, the circumferential groove 216 is disposed in an internal surface 252 of the socket receiving area 210 and at least partially surrounds the socket receiving area 210. The axial slots 214 may be disposed on diametrically opposing faces of the socket receiving area 210. In an embodiment, the axial slots 214 may be disposed less than 180 degrees from each other. While two axial slots are shown in the figures, it will be appreciated that three, four or more axial slots in the socket receiving area 210 may be provided.

The bias member 212 includes four spring-wire forms 218, 219, 220, 221 that are similar to spring-wire forms 118 and 120 described above. The first spring-wire form 218 includes a curved portion 222 and first 224 and second 226 arms having respective ends 228, 230. The first 224 and second 226 arms of the first spring-wire form 218 respectively include bent portions 232, 234. The second spring-wire form 220 includes a curved portion 236 and first 238 and second 240 arms having respective ends 242, 244. The first 238 and second 240 arms of the second spring-wire form 220 respectively includes bent portions 246, 248. The third spring-wire form 219 includes a curved portion 222' and first 224' and second 226' arms having respective ends 228', 230'. The first 224' and second 226' arms of the third spring-wire form 219 respectively includes bent portions 232', 234'. The fourth spring-wire form 221 includes a curved portion 236' and first 238' and second 240' arms having respective ends 242', 244'. The first 238 and second 240 arms of the second spring-wire form 219 respectively include bent portions 246, 248. The first and second spring-wire forms 218, 220 may be referred to as a first pair, and the third and fourth spring-wire forms 219, 221 may be referred to as a second pair. The first pair of spring-wire forms 218, 220 may be substantially disposed in axial slots 214 and circumferential groove 216 similarly to the spring-wire forms 118, 120, described above. The second pair of spring-wire forms 219, 221 may also be substantially disposed in the axial slots 214 and circumferential groove 216.

During operation, bent portions 232, 234, 246, 248, 232', 234', 246', 248' apply a radially inward bias force on the work piece and elastically move radially into axial slots 214 as the work piece is inserted into the socket receiving area 110. Conversely, bent portions 232, 234, 246, 248, 232', 234', 246', 248' retract due to the bias force (i.e., moves radially away from the axial slots 214) when the work piece is retracted from the socket receiving area 210.

Figure 12:
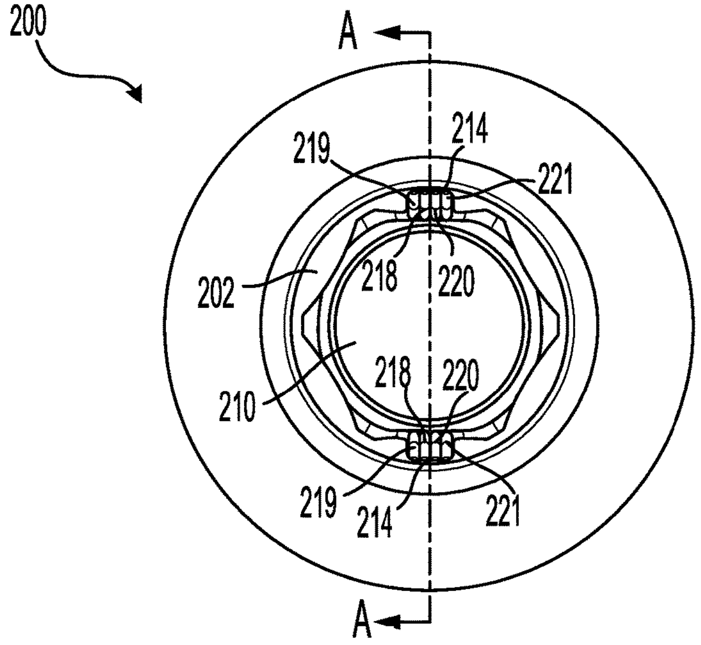
FIG. 12 is a plan, front view of a socket of FIG. 8.
Figure 13:
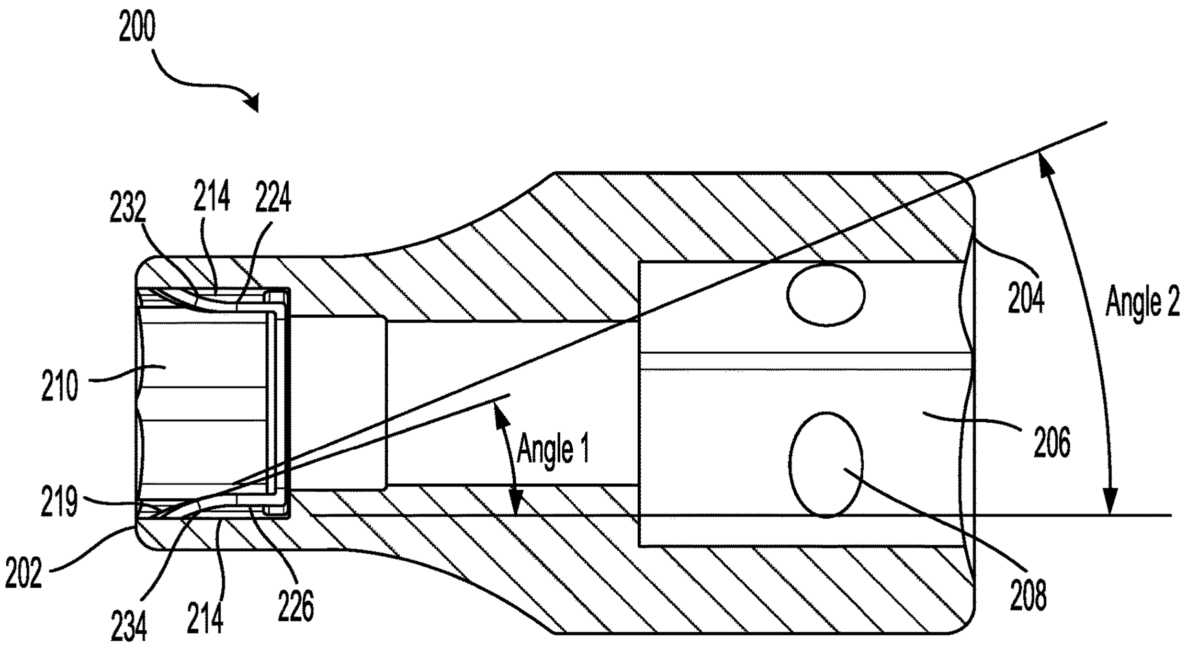
FIG. 13 is a section view of the socket taken along line A-A of FIG. 12.
Figure 14:
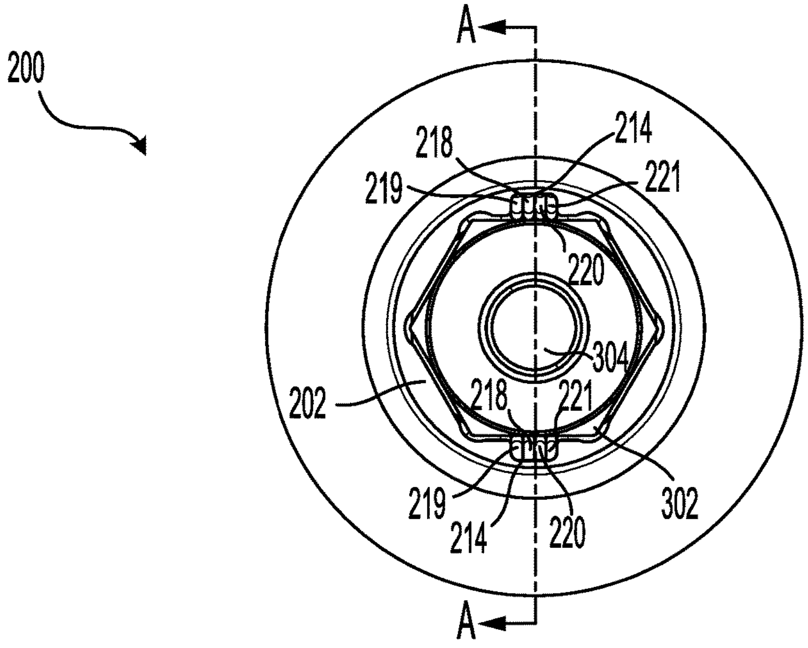
FIG. 14 is a plan, front view of the socket of FIG. 8, showing the socket engaged with an exemplar work piece.
Figure 15:
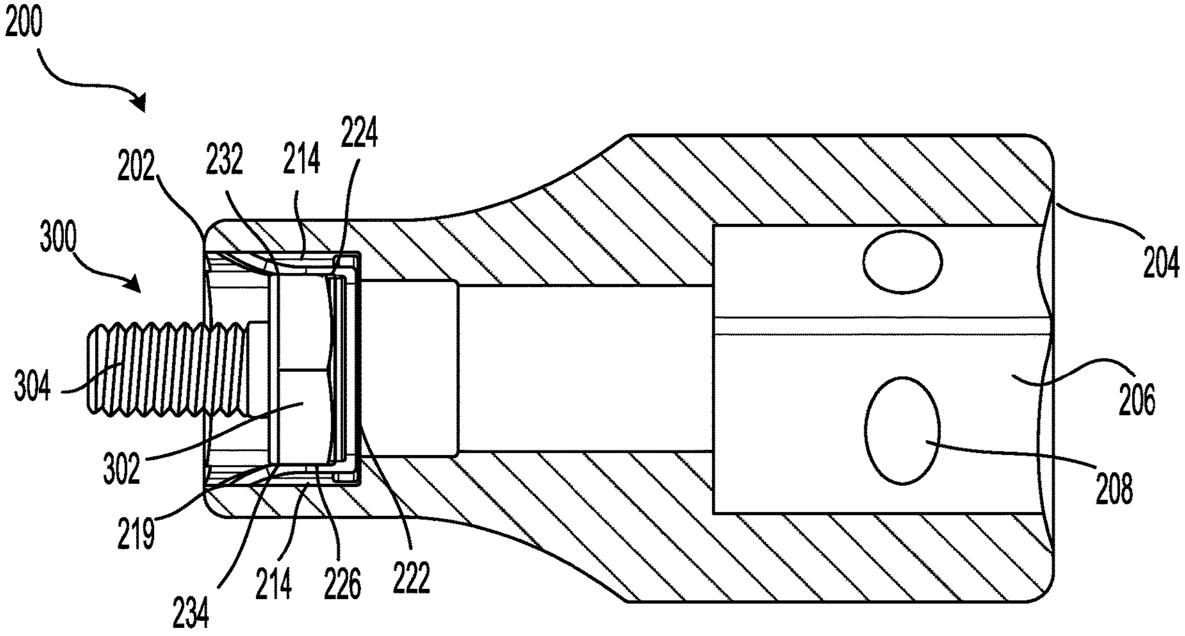
FIG. 15 is a section view of the socket taken along line A-A of FIG. 14.
Figure 16:
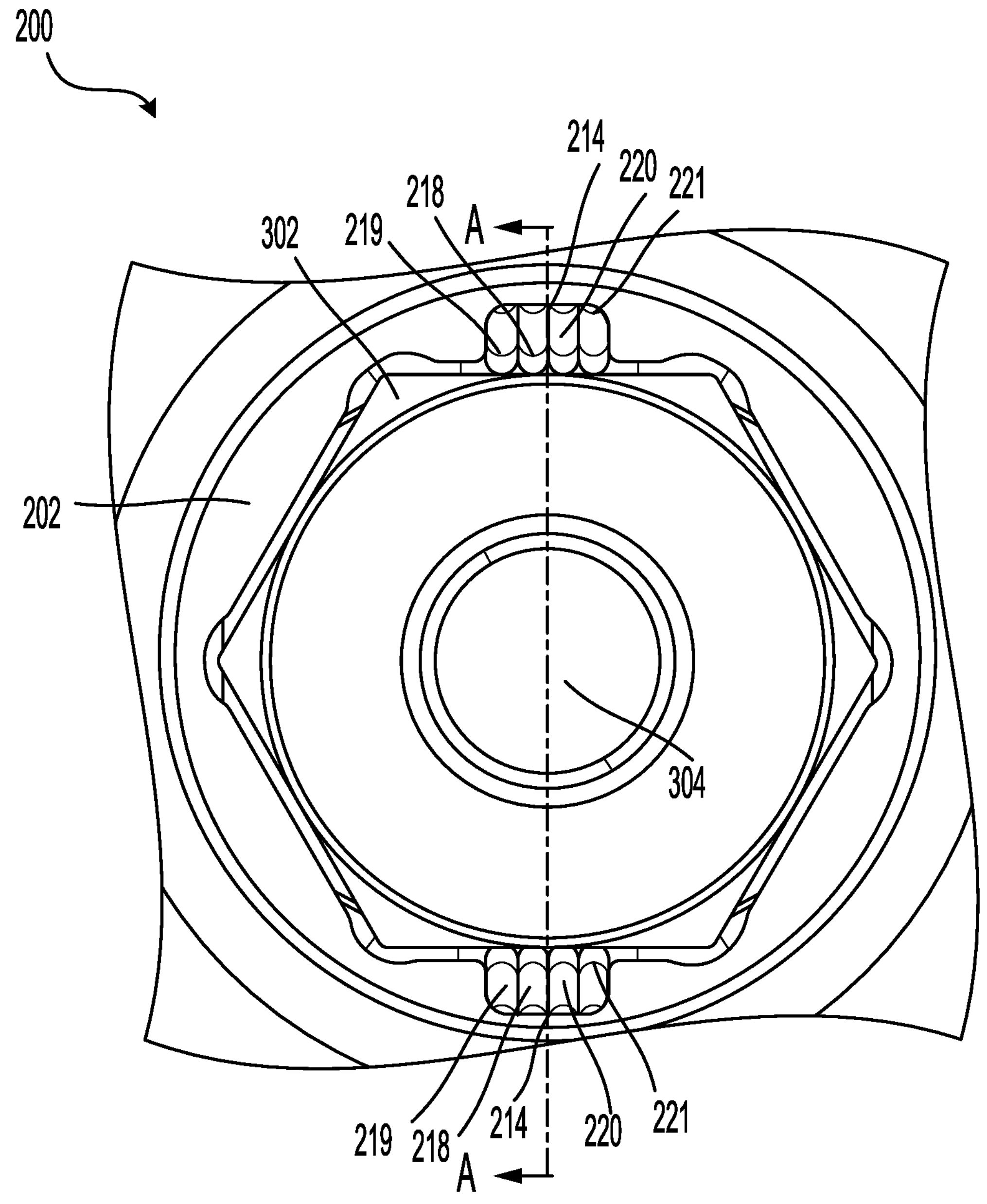
FIG. 16 is an enlarged plan, front view of the socket of FIG. 14, showing the socket engaged with an exemplar work piece.
Figure 17:
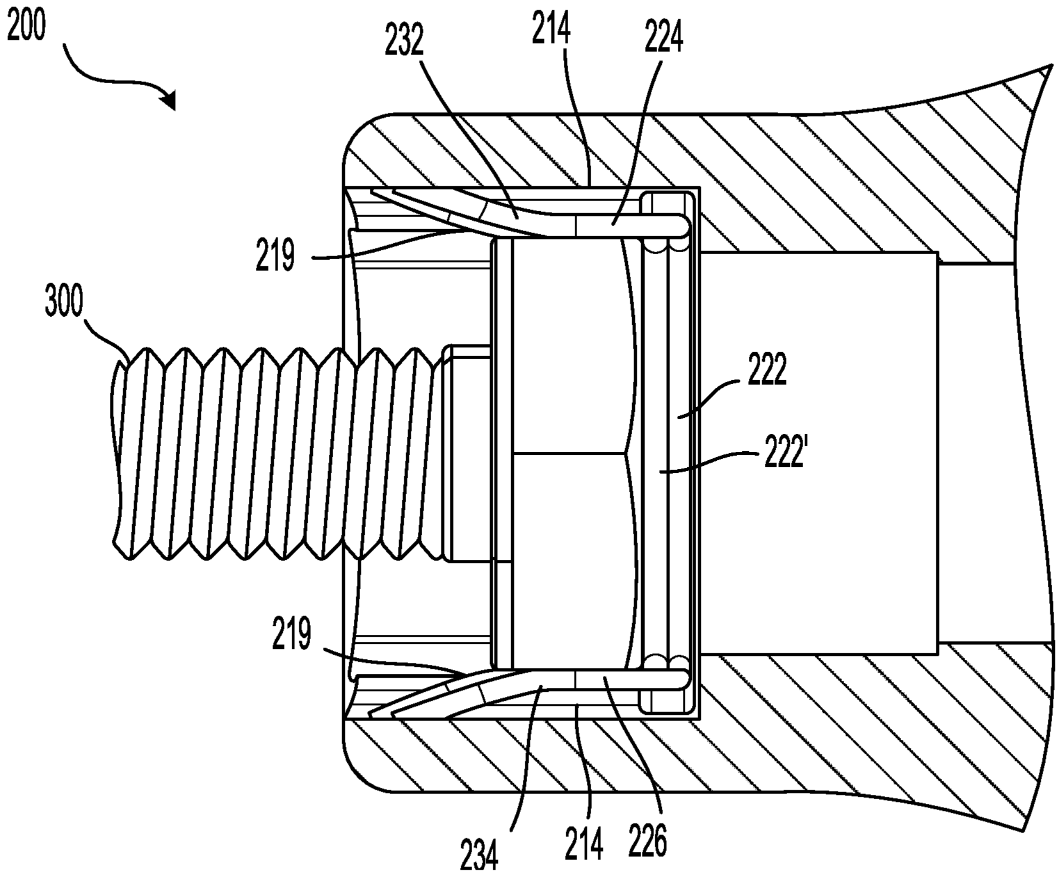
FIG. 17 is an enlarged section view of a portion of the socket of FIG. 15, showing the socket engaged with an exemplar work piece.

When disposed in the socket receiving area 210, spring-wire forms 218 and 220 face each other, with the curved portions 222, 236 extending away from each other, and arms 224 and 226 of the first spring-wire form 218 being adjacent to respective first and second arms 238, 240 of the second spring-wire form 220. The arms of second pair of spring wire forms 220, 221 are disposed in the axial slots 214 and also face each other. The arms of the first pair of spring-wire forms 218, 219 may provide a first angle of entry and the arms of the second pair of spring-wire forms 220, 221 may provide a second angle of entry. As shown in FIGS. 12 and 13, first angle (Angle 1) may be about 19 degrees, and second angle (Angle 2) may be about 22 degrees. In another embodiment, the angles of the bent portions of each arm of each spring-wire form may be substantially the same.

FIGS. 14-17 show an example conventional bolt 300 disposed in the socket receiving area 210. The bolt includes a hexagonal head 302 and a threaded portion 304. The head 302 of the bolt is securely held in position by the biasing forces from the respective arms of the spring-wire forms.

As used herein, the term "coupled" can mean any physical, electrical, magnetic, or other connection, either direct or indirect, between two parties. The term "coupled" is not limited to a fixed direct coupling between two entities.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A socket having a working end with a socket receiving area having an inner surface and that is adapted to receive a work piece, and an opposing drive end adapted to engage a lug of a torque application tool, the socket comprising:

first and second spring-wire forms adapted to apply a radially biased force to the work piece when the work piece is received in the socket receiving area, wherein each spring-wire form includes first and second ends and first and second arms respectively disposed proximal to the first and second ends, wherein the first arm of each of the first and second spring-wire forms includes a first bent portion defining an angle; and a first axial slot disposed in the inner surface of the socket receiving area and adapted to receive the first bent portions.

2. The socket of claim 1, wherein each of the first and second spring-wire forms includes a curved portion between the first and second arms.

3. The socket of claim 2, further comprising a circumferential groove disposed in the inner surface of the socket receiving area, wherein the circumferential groove is adapted to receive the curved portions of the first and second spring-wire forms.

4. The socket of claim 3, wherein the circumferential groove at least partially surrounds the socket receiving area.

5. The socket of claim 1, further comprising a second axial slot disposed in the inner surface of the socket receiving area, and wherein the second arm of each of the first and second spring-wire forms includes a second bent portion, and the second axial slot is adapted to receive the second bent portions.

6. The socket of claim 5, wherein the first and second axial slots are diametrically disposed in the socket receiving area.

7. The socket of claim 1, wherein the first and second axial slots include an end proximal to the working end of the socket adapted to retain the spring-wire form in the socket receiving area.

8. The socket of claim 1, wherein the first spring-wire form is substantially identical to the second spring-wire form.

9. The socket of claim 1, wherein the first and second arms of the first spring-form wire respectively substantially abut the first and second arms of the second spring-wire form.

10. A socket having a working end with a socket receiving area having an inner surface and that is adapted to receive a work piece, and an opposing drive end adapted to engage a lug of a torque application tool, the socket comprising:

first and a first and second pairs of spring-wire forms adapted to apply a biased force to the work piece when the work piece is received in the socket receiving area, wherein each spring-wire form of the first and the second pairs of spring-wire forms includes-opposing first and second ends and first and second arms proximal to the respective first and second ends, wherein the first arm of each of the first and second spring-wire forms includes a first bent portion; and a first axial slot disposed in the inner surface of the socket receiving area adapted to receive the first bent portions.

11. The socket of claim 10, wherein each of the spring-wire forms of the first and second pairs of spring-wire forms includes a curved portion between the first and second arms.

12. The socket of claim 11, further comprising a circumferential groove disposed in the inner surface of the socket receiving area, wherein the circumferential groove is adapted to receive the curved portions of the first and second pairs of spring-wire forms.

13. The socket of claim 10, wherein the first arms of the first pair of spring-wire forms substantially abut one another and the second arms of the first pair of spring wire forms substantially abut one another.

14. The socket of claim 10, wherein the first bent portions of the first pair of spring-wire forms has a first angle and the first bent portions of the second pair of spring-wire forms has a second angle, and the first and second angles are substantially the same.

15. The socket of claim 10, wherein the first bent portions of the first pair of spring-wire forms has a first angle and the first bent portion of the second pair of spring-wire forms has a second angle, and the first and second angles are different.

16. The socket of claim 10, further comprising a second axial slot disposed in the inner surface of the socket receiving area, wherein the first and second axial slots are diametrically disposed in the socket receiving area.

17. The socket of claim 10, wherein the first axial slot includes an end proximal to the working end of the socket adapted to retain the spring-wire forms in the work piece aperture.

18. The socket of claim 10, wherein the first pair of spring-wire forms is substantially identical to the second pair of spring-wire forms.

19. A socket having a working end with a socket receiving area having an inner surface and that is adapted to receive a work piece, and an opposing drive end adapted to engage a lug of a torque application tool, the socket comprising:

first and second spring-wire forms adapted to apply a biased force to the work piece when the work piece is received in the socket receiving area, wherein each of the first and second spring-wire forms includes first and second ends and first and second arms respectively disposed proximal to the first and second ends, wherein the first arm of the first spring-wire form includes a first bent portion, and the second arm of the second spring-wire form includes a second bent portion; and first and second axial slots disposed in the inner surface of the socket receiving area;

wherein the first axial slot is adapted to receive the first bent portion, and the second axial slot is adapted to receive the second bent portion.

20. The socket of claim 19, further comprising a circumferential groove disposed in the inner surface of the socket receiving area, wherein each of the first and second spring-wire forms includes a curved portion between the first and second arms, and the circumferential groove is adapted to receive the curved portions of the first and second spring-wire forms.

* * * * *